May 9, 1961  W. H. MEIKLEJOHN  2,983,349
MAGNETIC CLUTCH
Filed Oct. 17, 1957
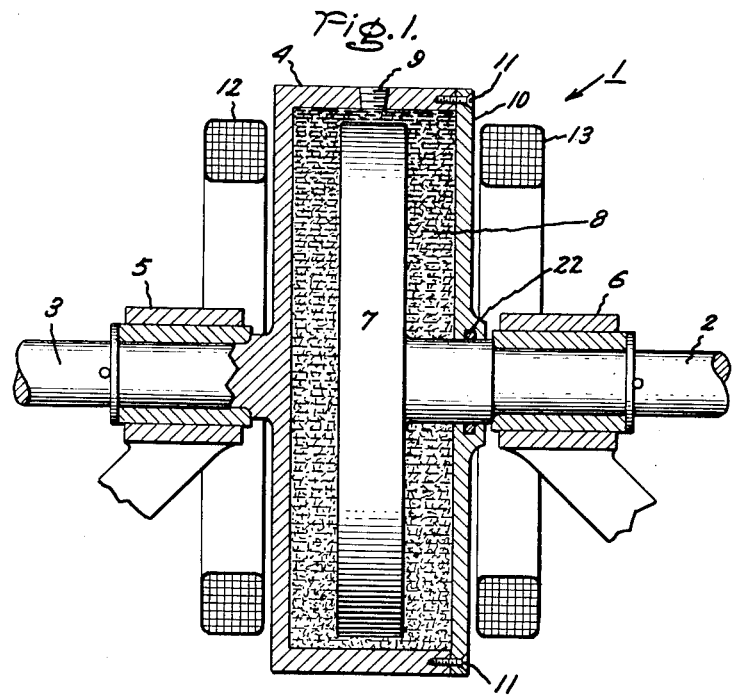
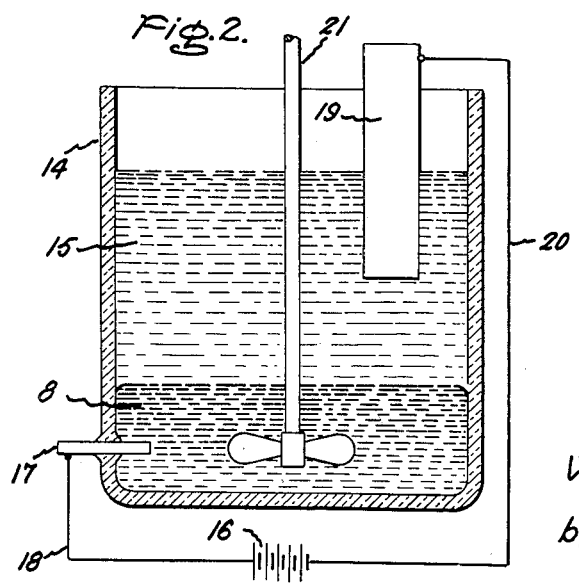
Inventor:
William H. Meiklejohn,
by Paul A. Frank
His Attorney.

United States Patent Office 2,983,349
Patented May 9, 1961

2,983,349

MAGNETIC CLUTCH

William H. Meiklejohn, Scotia, N.Y., assignor to General Electric Company, a corporation of New York Filed Oct. 17, 1957, Ser. No. 690,746

5 Claims. (Cl. 192—21.5)

This invention relates to magnetic clutches, brakes, and the like torque or force transmitting apparatus which employs for the particular torque transmitter, a fluid mixture or matrix capable of becoming relatively solidified upon the subjection to magnetic flux. More particularly, this invention relates to a specific fluid matrix together with torque transmitting apparatus employing the same.

A magnetic clutch may be briefly described as comprising a driving and a driven element with a space therebetween, the space being filled with a matrix such as iron particles suspended in oil. Upon rotation of the driving element, no torque is transmitted through the oil-iron mixture; however, when the oil-iron mixture is subjected to an electromagnetic field, the iron particles generally solidify by adhering to both the driving and the driven elements, and to each other, therefore providing a relatively solid connection between the said elements for torque transmittal. Depending on the strength of the magnetic field and its control, the shear strength of the solidified mixture may be varied. For overload breakaway conditions or slipping, or upon de-energizing the clutch, the initial break commences within the solidified oil-iron mixture, and not at the driving or driven element. It may be seen, therefore, that such clutches are advantageous in that there is little or no wear of the driving parts.

The development of the magnetic clutch has also evolved certain detrimental problems. One of these problems relates to heat dissipation. The constant shearing of the solidified iron particle mass creates considerable heat within the mixture. This heat must be absorbed or given off through the mechanical parts of the clutch assembly, and since the oil containing the iron particles is partially thermally insulating, the high temperature operation of these magnetic clutches has been detrimental to their service life. A further problem inherent in the oil-iron particle mixture relates to the tendency of the iron particles in the oil to settle out to one part of the clutch so that, upon energization of the clutch, faulty operation has been encountered. It should also be noted that a clutch incorporating a fluid mixture requires specific or special seals to contain the oil within the clutch during normal operating conditions.

Accordingly, it is an object of this invention to provide an improved magnetic clutch.

It is another object of this invention to provide a magnetic clutch having a fluid matrix of a high thermal conductivity to provide efficient cooling of the clutch.

It is still another object of this invention to provide a particular fluid matrix for a magnetic clutch to minimize sealing problems.

It is a still further object of this invention to provide a fluid matrix for magnetic clutches having a high shearing stress.

It is again another object of this invention to provide a fluid matrix wherein the magnetic particles remain in suspension without an undue tendency to settle out.

Briefly described, this invention in one form contemplates a magnetic clutch, brake, or other torque transmitting apparatus employing a fluid matrix between the driving and driven element, the matrix comprising magnetic particles suspended in a mercury carrier.

These and other objects of this invention will be better understood when taken in connection with the following specification and the drawings thereof, in which:

Fig. 1 represents a simplified example of a magnetic clutch employing a magnetic particle mercury carrier fluid matrix in accordance with this invention; and Fig. 2 is an illustration of one method of obtaining a magnetic particle dispersion in mercury.

Referring now to Fig. 1, there is illustrated a simplified magnetic clutch 1 which is generally employed for the transmission of torque or power from a driving shaft 2 to a driven shaft 3. The clutch 1 comprises in general a hollow cylindrical casing 4 which is affixed or otherwise connected to driven shaft 3 and supported for rotation by a suitable bearing 5. Driving shaft 2 is mounted for rotation within a bearing 6 and projects within the cylindrical casing 4. Within the cylindrical casing 4 there is positioned a cylinder or disc 7 of a magnetic material, and which is free to rotate within the casing 4. As illustrated, disc 7 is spaced from the walls of the casing 4 for free rotation. In accordance with this invention, the space between the disc 7 and the casing 4 is filled with mercury 8 containing iron particles in suspension, and a suitable plug 9 is utilized in order to maintain the desired level of the mercury-iron matrix or to add or withdraw therefrom. Other magnetic materials such as nickel, cobalt, and alloys of iron, nickel and cobalt, may be employed in this invention with good results.

Assembly and disassembly of this exemplary apparatus is accomplished through the use of a removable face 10 from the casing 4, the face 10 being maintained in position by means of screws 11 about the circumference thereof. Magnetizing or sodifying the fluid matrix is provided by means of a pair of electrical coils 12 and 13 concentrically positioned about shafts 2 and 3 and adjacent to each side of the casing 4 and correspondingly on each side of the disc 7.

It may be seen that, upon applying electrical power from a source (not shown) to coils 12 and 13, a magnetic field is generated between the said coils to provide magnetization of the iron particles in the mercury and solidification thereof. Upon rotation of the driving shaft 2, torque is transmitted from the disc 7 through the solidified matrix to casing 4 and thus to the driven shaft 3.

Fig. 2 discloses one method of obtaining an iron particle dispersion in a mercury carrier. This method is referred to as electrodeposition of iron in mercury and the apparatus generally includes a container 14 having a layer of mercury 8 at the bottom thereof, and a layer of a suitable electrolyte 15 such as ferrous ammonium sulfate or ferrous chloride thereabove. The mercury 8 is employed as the cathode for this process and is electrically connected to a suitable power source 16 by means of an electrode 17 and conductor 18. The anode of this apparatus is generally a ferrous strip 19 which is also connected to the power source 16 by means of a conductor 20.

Impressing current density on the ferrous strip 19 of approximately 0.05 ampere per square centimeter results in an electrodeposition of iron particles in the mercury 8, and the process is continued until the quantity of iron deposited in the mercury is about 12% by volume. During this process, agitation of the electrolyte and mercury may be provided by means of a suitable stirrer or mixer 21 which is shown in the mercury 8 and extending outside of the vessel 14 to be rotated by a desired power source or mechanism (not shown). In the magnetic matrix thus provided, the iron-deposited particles are wet by the mercury, and have generally a 2:1 density ratio of mercury to iron. This density ratio, it can be seen, results in a better suspension of the iron particles in the mercury without an undue tendency to settle out, which is an inherent problem with the iron particle suspended in oils.

The iron-mercury matrix is introduced into the casing 4 of Fig. 1 through the plug 9 to fill the space between disc 7 and casing 4. The high surface tension of the mercury permits the employment of relatively simple seals to seal the mercury in the casing 4. As shown in Fig. 1, a well known type of O ring seal 22 is provided between the shaft 2 and the wall 10 of the casing 4. Upon rotation of shaft 2, and when the coils 12 and 13 are energized, the mercury-iron matrix generally solidifies and torque is transmitted from disc 7 through the solidified matrix to the casing 4 for rotation thereof. The heat generated from the operation of this type of clutch may be easily dissipated through the mercury by reason of its high thermal conductivity to the outermost portions of the cylinder 4 which is generally air-cooled by its rotation within a given atmosphere. Further cooling may be provided in the form of ribs or fins (not shown) on the outermost portions of casing 4.

A clutch made in accordance with the disclosure of Fig. 1 and utilizing a mercury-iron matrix obtained by the method described and illustrated in Fig. 2 was found to have a torque delivery of 15 inch pounds, where the impressed magnetic field was 6,000 oersteds and the cylinder or disc 7 three inches in diameter.

This invention, therefore, contemplates a magnetic clutch, brake or like force transmitting apparatus which utilizes a mercury-iron matrix of good suspension properties in order to provide a high torque transmission with attendant minimization of the cooling and sealing problem.

While there are illustrated and described particular embodiments of this invention, modifications thereof will occur to those skilled in the art. It is to be understood, therefore, that this invention is not to be limited to the particular arrangments as disclosed, and it is intended in the appended claims to cover all modifications which do not depart from the spirit and scope of this invention.

What I claim as new and desire to secure by Letters Patent of the United States is:

1. A magnetic clutch having spaced apart driving and driven elements, a fluid matrix between said driving and driven elements, said matrix comprising a mercury carrier and electrodeposited magnetic particles in suspension therein.

2. The invention as claimed in claim 1 wherein said magnetic particles include iron.

3. The invention as claimed in claim 1 wherein said magnetic particles include nickel.

4. The invention as claimed in claim 1 wherein said magnetic particles include cobalt.

5. The invention as described in claim 1 wherein the magnetic matrix includes approximately 88% mercury and 12% iron electrodeposited in said mercury, the said percentage being by volume.

References Cited in the file of this patent
UNITED STATES PATENTS

| | | |
|---|---|---|
| 2,149,782 | Lucus | Mar. 7, 1939 |
| 2,336,298 | Urban | Jan. 2, 1945 |
| 2,389,691 | Schumacher et al. | Nov. 27, 1945 |
| 2,778,466 | Perry | Jan. 22, 1957 |

OTHER REFERENCES

Induced Fibration of Suspensions, by W. M. Winslow, Journal of Applied Physics, vol. 20, December 1949, pages 1137–1140.